(12) United States Patent
Jang et al.

(10) Patent No.: US 10,601,052 B2
(45) Date of Patent: Mar. 24, 2020

(54) REVERSIBLE FUEL CELL OXYGEN ELECTRODE, REVERSIBLI FUEL CELL INCLUDING THE SAME, AND METHOD FOR PREPARING THE SAME

(71) Applicant: KOREA INSTITUTE OF SCIENCE AND TECHNOLOGY, Seoul (KR)

(72) Inventors: Jong Hyun Jang, Seoul (KR); Byungseok Lee, Seoul (KR); Hee-Young Park, Seoul (KR); Hyoung-Juhn Kim, Seoul (KR); Dirk Henkensmeier, Seoul (KR); Sung Jong Yoo, Seoul (KR); Jin Young Kim, Seoul (KR); So Young Lee, Seoul (KR); Jaeyune Ryu, Seoul (KR); Sung Pil Yoon, Seoul (KR); Jonghee Han, Seoul (KR); Suk Woo Nam, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 428 days.

(21) Appl. No.: 15/360,034

(22) Filed: Nov. 23, 2016

(65) Prior Publication Data
US 2017/0187042 A1   Jun. 29, 2017

(30) Foreign Application Priority Data
Dec. 24, 2015  (KR) .................... 10-2015-0186796

(51) Int. Cl.
| H01M 4/86 | (2006.01) |
| H01M 4/88 | (2006.01) |
| H01M 4/92 | (2006.01) |
| H01M 8/18 | (2006.01) |

(52) U.S. Cl.
CPC ....... *H01M 4/8657* (2013.01); *H01M 4/8615* (2013.01); *H01M 4/886* (2013.01); *H01M 4/8807* (2013.01); *H01M 4/8853* (2013.01); *H01M 4/926* (2013.01); *H01M 8/186* (2013.01); *Y02E 60/528* (2013.01)

(58) Field of Classification Search
None
See application file for complete search history.

(56) References Cited

U.S. PATENT DOCUMENTS

| 7,167,355 B2 | 1/2007 | Chen |
| 2003/0107852 A1 | 6/2003 | Chen |

FOREIGN PATENT DOCUMENTS

| JP | 2007-222732 A | 9/2007 |
| KR | 1994-0000606 A | 1/1994 |
| KR | 1994-0025995 A | 12/1994 |
| KR | 10-2007-0032358 A | 3/2007 |
| KR | 10-2013-0123263 A | 11/2013 |

OTHER PUBLICATIONS

Lee, Byung-Seok; Development of porous Pt/IrO2/carbon paper electrocatalysts with enhances mass transport as oxygen electrodes in unitized regenerative fuel cells; Electrochemistry Communications 64, Jan. 12, 2016, pp. 14-17 (Year: 2016).*
Ye, Feng et al., "Pt-IrO2 nanorod array electrode for oxygen evolution in PEM water electrolysis cell", *Asia-Pacific Journal of Chemical Engineering*, vol. 8, 2013 (pp. 271-277).
Wang, Hongjuan et al., "Pt/IrO2/CNT anode catalyst with high performance for direct methanol fuel cells", *Catalysis Communications*, vol. 33, 2013, (pp. 34-37).
Zhigang, Shao, et al. "Bifunctional electrodes with a thin catalyst layer for 'unitized' proton exchange membrane regenerative fuel cell." Journal of Power Sources 79.1 (1999): 82-85. (4 pages in English).
Song, Shidong, et al. "Bifunctional oxygen electrode with corrosion-resistive gas diffusion layer for unitized regenerative fuel cell." Electrochemistry Communications 8.3 (2006): 399-405. (7 pages English).
Zhang, Yangjian, et al. "Deposited RuO 2—IrO 2/Pt electrocatalyst for the regenerative fuel cell." International Journal of Hydrogen Energy 32.3 (2007): 400-404. (5 pages in English).
Chen, Guobao, et al. "A novel membrane electrode assembly for improving the efficiency of the unitized regenerative fuel cell." Electrochemistry Communications 10.9 (2008): 1373-1376. (4 pages in English).
Jung, Ho-Young, et al. "Performance of gold-coated titanium bipolar plates in unitized regenerative fuel cell operation." Journal of Power Sources 194.2 (2009): 972-975. (4 pages in English).
Jung, Ho-Young, et al. "High-durability titanium bipolar plate modified by electrochemical deposition of platinum for unitized regenerative fuel cell (URFC)." Journal of Power Sources 195.7 (2010): 1950-1956. (7 pages in English).
Grigoriev, S. A., et al. "Design and characterization of bi-functional electrocatalytic layers for application in PEM unitized regenerative fuel cells." International Journal of Hydrogen Energy 35.10 (2010): 5070-5076. (7 pages in English).
Altmann, Sebastian, Till Kaz, and Kaspar Andreas Friedrich. "Bifunctional electrodes for unitised regenerative fuel cells." Electrochimica Acta 56.11 (2011): 4287-4293. (7 pages in English).
Zhuo, Xiaolong, et al. "Electrode structure optimization combined with water feeding modes for Bi-Functional Unitized Regenerative Fuel Cells." International Journal of Hydrogen Energy 38.11 (2013): 4792-4797. (6 pages in English).
Chen J. et al. "Improving the Long-term Durability of PEMFC Cathode by Employing Pt/TiO2/C and Pt/IrO2/C Catalysts." *The 60th Annual Meeting of the International Society of Electrochemistry*. Aug. 16, 2009.
Lee, Byung-Seok et al., "Development of electrodeposited IrO2 electrodes as anodes in polymer electrolyte membrane water electrolysis." *Applied Catalysis B: Environmental*, 2015, vol. 179, pp. 285-291. Dec. 2015.

* cited by examiner

Primary Examiner — Sarah A. Slifka
(74) Attorney, Agent, or Firm — NSIP Law

(57) ABSTRACT

Disclosed are a reversible fuel cell oxygen electrode in which $IrO_2$ is electrodeposited and formed on a porous carbon material and platinum is applied thereon to form a porous platinum layer, a reversible fuel cell including the same, and a method for preparing the same. According to the corresponding reversible fuel cell oxygen electrode, as the loading amounts of $IrO_2$ and platinum used in the reversible fuel cell oxygen electrode can be lowered, it is possible to exhibit excellent reversible fuel cell performances (excellent fuel cell performance and water electrolysis performance) by improving the mass transport of water and oxygen while being capable of reducing the loading amounts of $IrO_2$ and platinum. Further, it is possible to exhibit a good activity of a catalyst when the present disclosure is applied to a reversible fuel cell oxygen electrode and to reduce corrosion of carbon.

19 Claims, 16 Drawing Sheets

REVERSIBLE FUEL CELL OXYGEN ELECTRODE, REVERSIBLI FUEL CELL INCLUDING THE SAME, AND METHOD FOR PREPARING THE SAME

CROSS-REFERENCE TO RELATED APPLICATION

This application claims the priority of Korean Patent Application No. 10-2015-0186796, filed on Dec. 24, 2016, and all the benefits accruing therefrom under 35 U.S.C. § 119, the contents of which in its entirety are herein incorporated by reference.

BACKGROUND

1. Field

The present specification describes a reversible fuel cell oxygen electrode, a reversible fuel cell including the same, and a method for preparing the same.

[Description about Government-Sponsored Research and Development]

This research was supervised by the Korea Institute of Science and Technology, and sponsored by the Ministry of Science, ICT and Future Planning of Korea. The project name was "Development of Innovative technology regarding electrolysis of $CO_2$ at a low temperature for producing synthesis gas" (project number: 1711027334). This research was also supervised by the Korea Institute of Science and Technology, and sponsored by the Ministry of Trade, Industry and Energy of Korea. The project name was "Development of source technology regarding non-platinum catalyst for reducing the price of fuel cells for automobiles" (project number: 20133010011320).

2. Description of the Related Art

As a means for replacing an existing system based on fossil fuels, renewable energy resources such as solar light or wind power have attracted much attention. The production of electric power by these renewable energy sources greatly depends on the weather or an energy storage system (ESS) capable of storing an additional electric power, and the like.

A reversible fuel cell or regenerative fuel cell (hereinafter referred to as RFC) enables bidirectional conversion between electricity and hydrogen, and has been considered as a promising candidate for electrochemical energy storage. Since an energy capacity of a system based on the RFC may be increased regardless of electric power, capital costs for expanding the energy capacity are lower than those of lithium batteries. Accordingly, the RFC is expected to be suitable for being applied to large capacity systems.

RFCs are classified into RFCs in which a fuel cell and a water electrolysis device are integrated (unitized regenerative fuel cells, hereinafter referred to as URFC) and RFCs in which a fuel cell and a water electrolysis device are separated (discrete regenerative fuel cells, hereinafter referred to as DRFC).

The DRFC can use commercially available fuel cells or water electrolysis devices, and thus, the technical entry barrier thereof is low, whereas the URFC has integrated fuel cells and water electrolysis devices, and thus, the technical entry barrier thereof is relatively high, but it is considered that capital costs due to the integration can be decreased.

However, a large loading amount of a noble metal electrochemical catalyst is generally required for the URFC in the related art, and there is a problem in that the system costs are increased for this reason. Since the oxygen reduction reaction [hereinafter referred to as ORR] and the oxygen evolution reaction [hereinafter referred to as OER] are slow, an electrochemical catalyst of platinum (Pt) and iridium (Ir) or iridium oxide ($IrO_2$) has been together with the URFC, and for example, Pt—Ir alloys or ($RuO_2$—$IrO_2$)/Pt catalysts have been studied.

Since the content of the noble metal catalyst is high in these studies, attempts for lowering the content of the noble metal catalyst have been made. However, the water electrolysis and fuel cell performance of the RFC have been at an unsatisfactory level, and a high content of the noble metal catalyst is still required.

REFERENCES OF THE RELATED ART

Non-Patent Documents

Non-Patent Document 1: G. B. Chen, H. M. Zhang, J. B. Cheng, Y. W. Ma, H. X. Zhong, A novel membrane electrode assembly for improving the efficiency of the unitized regenerative fuel cell, Electrochem. Commun., 10 (2008) 1373-1376.

Non-Patent Document 2: S. D. Song, H. M. Zhang, X. P. Ma, Z. G. Shao, Y. N. Zhang, B. L. Yi, Bifunctional oxygen electrode with corrosion-resistive gas diffusion layer for unitized regenerative fuel cell, Electrochem. Commun., 8 (2006) 399-405.

Non-Patent Document 3: Y. Zhang, C. Wang, N. Wan, Z. Mao, Deposited RuO2-IrO2/Pt electrocatalyst for the regenerative fuel cell, Int. J. Hydrogen. Energ., 32 (2007) 400-404.

Non-Patent Document 4: S. Altmann, T. Kaz, K. A. Friedrich, Bifunctional electrodes for unitised regenerative fuel cells, Electrochimica Acta, 56 (2011) 4287-4293.

Non-Patent Document 5: H. Y. Jung, S. Y. Huang, B. N. Popov, High-durability titanium bipolar plate modified by electrochemical deposition of platinum for unitized regenerative fuel cell (URFC), J. Power Sources, 195 (2010) 1950-1956.

Non-Patent Document 6: X. L. Zhuo, S. Sui, J. L. Zhang, Electrode structure optimization combined with water feeding modes for Bi-Functional Unitized Regenerative Fuel Cells, Int. J. Hydrogen. Energ., 38 (2013) 4792-4797.

Non-Patent Document 7: S. A. Grigoriev, P. Millet, K. A. Dzhus, H. Middleton, T. O. Saetre, V. N. Fateev, Design and characterization of bi-functional electrocatalytic layers for application in PEM unitized regenerative fuel cells, Int. J. Hydrogen. Energ., 35 (2010) 5070-5076.

Non-Patent Document 8: H. Y. Jung, S. Y. Huang, P. Ganesan, B. N. Popov, Performance of gold-coated titanium bipolar plates in unitized regenerative fuel cell operation, J. Power Sources, 194 (2009) 972-975.

Non-Patent Document 9: S. Zhigang, Y. Baolian, H. Ming, Bifunctional electrodes with a thin catalyst layer for 'unitized' proton exchange membrane regenerative fuel cell, J. Power Sources, 79 (1999) 82-85.

SUMMARY

In an aspect, embodiments of the present disclosure provide a reversible fuel cell oxygen electrode which may achieve excellent reversible fuel cell performances (excellent fuel cell performance and water electrolysis performance) by improving the mass transport of water and oxygen while being capable of reducing the content of a noble metal used in the reversible fuel cell oxygen electrode, particularly, a loading amount of $IrO_2$ and a content of platinum, a reversible fuel cell including the same, and a method for preparing the same.

In another aspect, embodiments of the present disclosure provide a reversible fuel cell oxygen electrode which may improve the activity of a catalyst and reduce corrosion of carbon when being applied to the reversible fuel cell oxygen electrode, a reversible fuel cell including the same, and a method for preparing the same.

In still another aspect, embodiments of the present disclosure provide a reversible fuel cell oxygen electrode of which the preparation process is simple and which may greatly reduce the preparation costs, a reversible fuel cell including the same, and a method for preparing the same.

Embodiments of the present disclosure provide a reversible fuel cell oxygen electrode in which $IrO_2$ is electrodeposited and formed on a porous carbon material, for example, a hydrophilic porous carbon material, and platinum is applied onto the electrodeposited porous carbon material to form a porous platinum layer, and a reversible fuel cell including the same.

Embodiments of the present disclosure also provide a method for preparing a reversible fuel cell oxygen electrode, the method including: electrodepositing $IrO_2$ on a porous carbon material, for example, a hydrophilic porous carbon material; and applying platinum onto the $IrO_2$ electrodeposited porous carbon material to form a porous platinum layer.

According to embodiments of the present disclosure, as the loading amounts of $IrO_2$ and platinum, which are used in a reversible fuel cell oxygen electrode, may be lowered, it is possible to exhibit excellent reversible fuel cell performances (excellent fuel cell performance and water electrolysis performance) by improving the mass transport of water and oxygen while being capable of reducing the amount of a noble metal used. Further, it is possible to exhibit a good activity of a catalyst when the present disclosure is applied to a reversible fuel cell oxygen electrode and to reduce corrosion of carbon when a carbon material is used. In addition, the preparation processes are very simple as compared to the processes in the related art, and may greatly reduce the preparation costs.

DETAILED DESCRIPTION

Figure 1A:
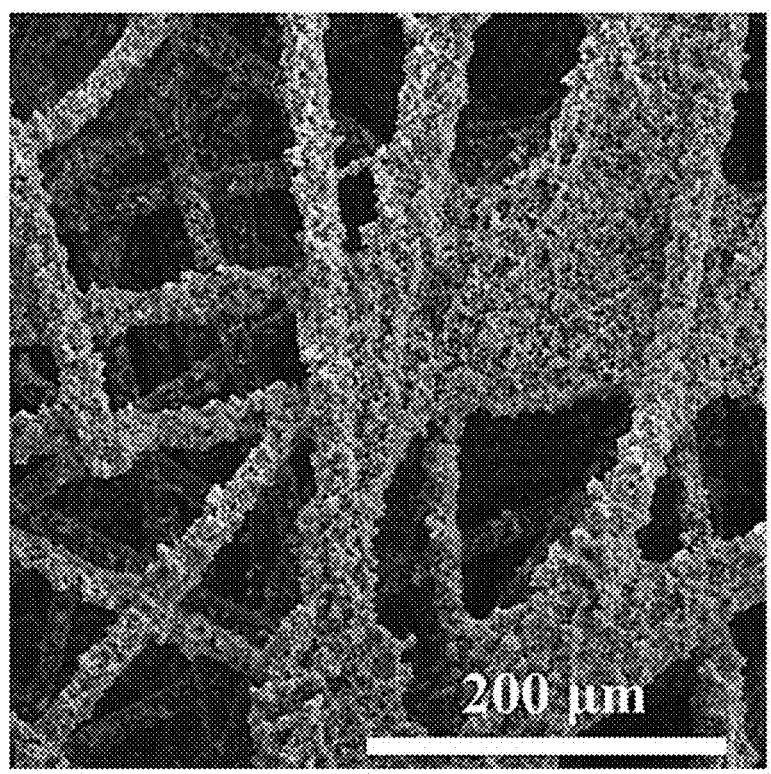
FIGS. 1A to 1C show SEM images of the $Pt/IrO_2/CP$ electrodes of the Examples of the present disclosure, respectively.

Hereinafter, exemplary embodiments of the present disclosure will be described in detail.

The present inventors have confirmed that $IrO_2$ is formed on a porous carbon material, preferably a porous carbon material having macropores as an oxygen electrode material of a reversible fuel cell, particularly, a material formed by electrodeposition is used, platinum is also applied onto the corresponding $IrO_2$ to form a porous platinum layer, and the loading amount of $IrO_2$ is reduced to significantly reduce a content of iridium being a noble metal used, and it is possible to achieve excellent reversible cell performances (excellent fuel cell performance and water electrolysis performance) by improving the mass transport of oxygen and water.

Thus, in an aspect, embodiments of the present disclosure provide an oxygen electrode for a reversible fuel cell, in which $IrO_2$ is electrodeposited on a porous carbon material, and thus, a porous platinum layer is formed.

In an exemplary embodiment, the porous carbon material may be a hydrophilic porous carbon material.

In a non-limiting example, the porous carbon material may be a porous carbon material having macropores due to inter-fiber spaces.

First, when the electrodeposition of $IrO_2$ is described in detail, in the case where $IrO_2$ is electrodeposited onto the above-described porous carbon material, the porous carbon material has peculiar shape (or morphology) to structure of electrodeposition, which is differentiated from the case of using another preparation method for forming $IrO_2$ on the corresponding porous carbon material (for example, a spray method, a decal method, or the like).

That is, when $IrO_2$ is formed on a porous carbon material by electrodeposition, while $IrO_2$ particles (for example, spherical particles) begin to be formed, the $IrO_2$ particles are produced on the surface of the porous carbon material and grown in the form of a film, and as a result, the surface of the porous carbon material is covered (that is, surface-covered) with an $IrO_2$ layer (or may also be expressed as an $IrO_2$ film), and the surface of the porous carbon material has a form (structure) in which $IrO_2$ particles further formed by the electrodeposition are attached (or deposited) onto the corresponding $IrO_2$ layer.

In an exemplary embodiment, the $IrO_2$ layer covers the surface of the porous carbon material, and it is preferred to cover the surface such that the porous carbon material is not exposed. That is, a preferred oxygen electrode structure is a carbon exposure-free structure in which the surface of the porous carbon material is covered with an $IrO_2$ layer, and the carbon material is not exposed. Further, it is preferred that the $IrO_2$ layer has a crack-free structure. That is, a preferred oxygen electrode structure is a crack-free structure in which the surface of the porous carbon material is covered with an $IrO_2$ layer, and the $IrO_2$ layer does not have any cracks.

Meanwhile, $IrO_2$ is electrodeposited as described above, and then platinum is applied thereon by a method such as spray to form a porous platinum layer.

When $IrO_2$ is electrodeposited as described above, $IrO_2$ may be formed so as to have a surface in the porous carbon material. For example, when $IrO_2$ is electrodeposited onto a carbon paper composed of fibers, the electrodeposited $IrO_2$/CP has a curved surface, and as a result, when a platinum catalyst ink is sprayed thereon and the solvent is evaporated to dry the carbon paper, for example, a highly porous platinum layer may be obtained as the shrinkage of a platinum application layer becomes different like a shape in which charcoal is split (see FIGS. 1A to 1D to be described below).

Accordingly, in an exemplary embodiment, a reversible fuel cell oxygen electrode has a structure in which the surface of a carbon material is covered with an $IrO_2$ layer, and $IrO_2$ particles are attached (or deposited) onto the corresponding $IrO_2$ layer, and a porous platinum layer is formed on the $IrO_2$ layer or $IrO_2$ particles.

An electrode structure in which a platinum layer is applied onto the $IrO_2$-coated porous material ($IrO_2$-coated CP) may have an open structure having macropores due to the porous carbon material and micropores due to the porous platinum layer.

Specifically, the micropores may be, for example, sub-micrometer-sized pores of less than 1 micrometer, and the macropores may be pores having a size of several micrometers to several hundred micrometers, for example, 1 to 100 micrometers. The open structure is an open structure in which pores of an electrode may be connected to the interface of a membrane. Accordingly, reactants and products are easily supplied and discharged, respectively.

In an exemplary embodiment, the macropores may be derived from pores of a porous carbon material. For example, the porous carbon material may be a material in which macropores are formed by inter-fiber spaces, and may be a material in which the macropores of the porous carbon material are maintained as the $IrO_2$ layer and porous platinum layer are formed on individual strands of fiber.

As described above, the macropores have an open structure in which the macropores are connected to the interface between an electrochemical catalyst and a membrane, and in exemplary embodiments of the present disclosure, the macropores in this open structure are little interrupted by the platinum layer. Accordingly, mass transport of supplying oxygen and removing water is smoothly conducted through the corresponding open structure. Oxygen produced from the $IrO_2$ layer may be easily removed through a porous platinum layer, and minimally interrupts the OER in the $IrO_2$ layer. As described above, the porous structure in the $Pt/IrO_2$/CP electrochemical catalyst is a structure which easily transports materials and is very advantageous for the resulting high activity.

In a non-limiting example, the $IrO_2$ layer has a thickness of 0.01 to 1 μm, preferably 10 to 210 nm, and more preferably 70 to 210 nm, and $IrO_2$ particles have a size of 0.1 to 3 μm, preferably 0.25 to 1.2 μm.

In a non-limiting example, a loading amount of $IrO_2$ on the porous carbon material may be 0.01 to 1.00 mg $cm^{-2}$ or 0.01 to 0.54 mg $cm^{-2}$.

In a non-limiting example, the porous platinum layer may have a thickness of 0.5 to 3 micrometers.

In a non-limiting example, a loading amount of platinum may be 0.01 to 1 mg $cm^{-2}$, more specifically 0.1 mg $cm^{-2}$ or more, and for example, 0.3 mg $cm^{-2}$.

Meanwhile, the carbon material is porous, and thus may increase the catalytically active surface area, and the carbon material is also hydrophilic, and thus may be applied to an electrodeposition process based on an aqueous solution. In an exemplary embodiment, the porous carbon material is preferably a carbon paper composed of carbon fibers. The carbon paper has inter-carbon fiber pores.

In another aspect, exemplary embodiments of the present disclosure also provide a method for preparing a reversible fuel cell oxygen electrode, the method including: electrodepositing $IrO_2$ on a porous carbon material, for example, a hydrophilic porous carbon material; and applying platinum onto the $IrO_2$ electrodeposited porous carbon material to form a porous platinum layer.

In an exemplary embodiment, when electrodeposition is performed on the porous carbon material, one or more of a deposition voltage and a deposition time may be adjusted.

In an exemplary embodiment, the deposition voltage is preferably 0.6 to 0.9 V. Further, the deposition time is preferably 1 minute to 30 minutes.

Meanwhile, in another aspect, embodiments of the present disclosure provide a reversible fuel cell including the oxygen electrode.

Specifically, in an exemplary embodiment, the reversible fuel cell may include a polymer electrolyte film, a hydrogen electrode (a commercially available hydrogen electrode may be used) formed at one side of the film, and the above-described oxygen electrode formed at the other side of the film.

In an exemplary embodiment, the reversible fuel cell exhibits high URFC performance even in a small loading amount (for example, 0.1 to 0.4 mg $cm^{-2}$) of an oxygen electrochemical catalyst, as compared to an electrode in the related art, such as an electrode having a film structure.

Hereinafter, the present disclosure will be described in more detail through Examples and experiments, but the present disclosure is not limited to the content described below.

Examples

TGPH-090 CP (manufactured by Toray Co., Ltd.) being a porous carbon material was used as a substrate, and then an electrodeposition was performed at a deposition voltage of 0.7 V to prepare an $IrO_2$/CP electrode. At the corresponding electrode, the loading amount of $IrO_2$ was 0.1 mg $cm^{-2}$. The electrode is represented by IP0.

In order to an oxygen electrode, a platinum electrochemical ink was prepared by using a platinum black powder (manufactured by Johnson Matthey Corp.), a 5 wt. % Nafion dispersion liquid (manufactured by DuPont Co., Ltd.), 1,2-propanol (manufactured by J. T. baker Inc.), and deionized water, and the ink was sprayed onto IP0 to form a porous platinum layer on the IP0.

Electrodes were prepared by adjusting the loading amount of platinum to 0.1 mg $cm^{-2}$ (represented by IP1), 0.2 mg $cm^{-2}$ (represented by IP2), and 0.3 mg $cm^{-2}$ (represented by IP3), respectively.

As a hydrogen electrode, a dispersion liquid in which Pt/C (46.3 wt. %, TKK) and a Nafion ionomer were mixed with 1,2-propanol/deionized water was sprayed and applied onto a carbon material having a single layer (10 BC, SGL Ltd.) to prepare a Pt/C layer (0.4 mg cm$^{-2}$).

The pore structure and composition of the electrode prepared as described above were each analyzed by SEM (Inspect F50, manufactured by Field emission Limited) and electron-probe micro-analysis (EPMA, JXA-8500F, JEOL). A sample for a cross-section image was obtained by using a focused ion beam (FIB; Nova 600, FEI). XRD and XPS analyses were each performed by using Dmax2500/Server (manufactured by Rigaku Co., Ltd.) and ESCA 2000 (manufactured by Thermo Co., Ltd.).

For URFC single cell tests, an oxygen electrode (IP0-IP4) and a hydrogen electrode were placed at one side of an N212 membrane (manufactured by DuPont Co., Ltd.) to prepare an MEA, and the corresponding MEA was bonded to a graphite bipolar plate (manufactured by CNL Energy Co., Ltd.) having a serpentine channel to prepare a URFC single cell. The active surface was 6.25 cm$^2$. The FC activity was measured at 80° C. During the measurement, completely humidified hydrogen (100 mL min$^{-1}$) and oxygen (100 mL min$^{-1}$) were supplied to a hydrogen electrode and an oxygen electrode, respectively. A polarization curve of the fuel cell was obtained by increasing the current density from 0 to 1.2 A cm$^{-2}$. Meanwhile, for water electrolysis operation, deionized water (15 mL min$^{-1}$) was supplied to the oxygen electrode of the single cell, and a polarization curve was obtained over 1.35 to 2.0 V, with a stepwise increase at intervals of 0.05V (using HCP-803, manufactured by Biologics Inc.).

Figure 1B:
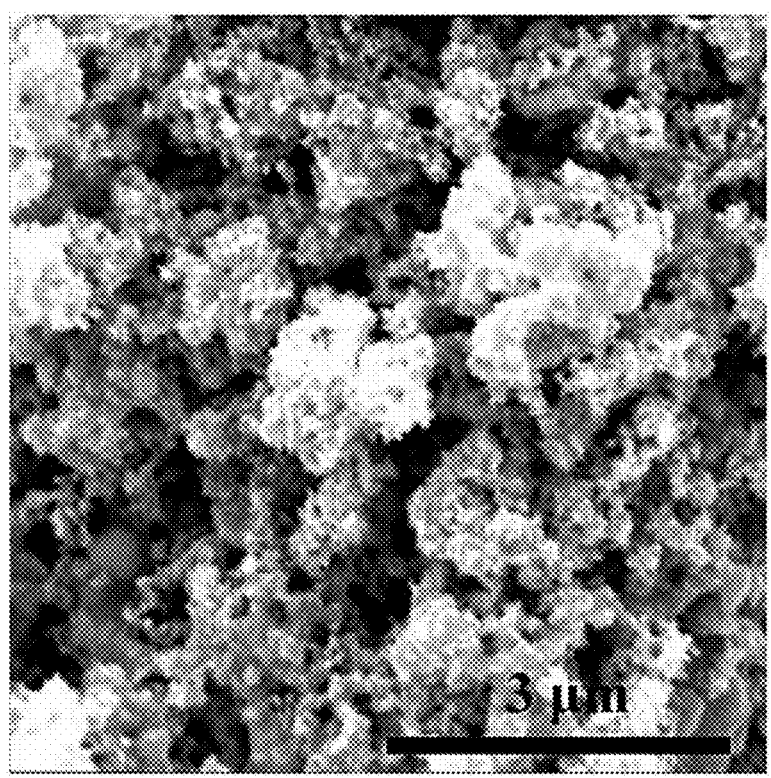
Figure 1C:
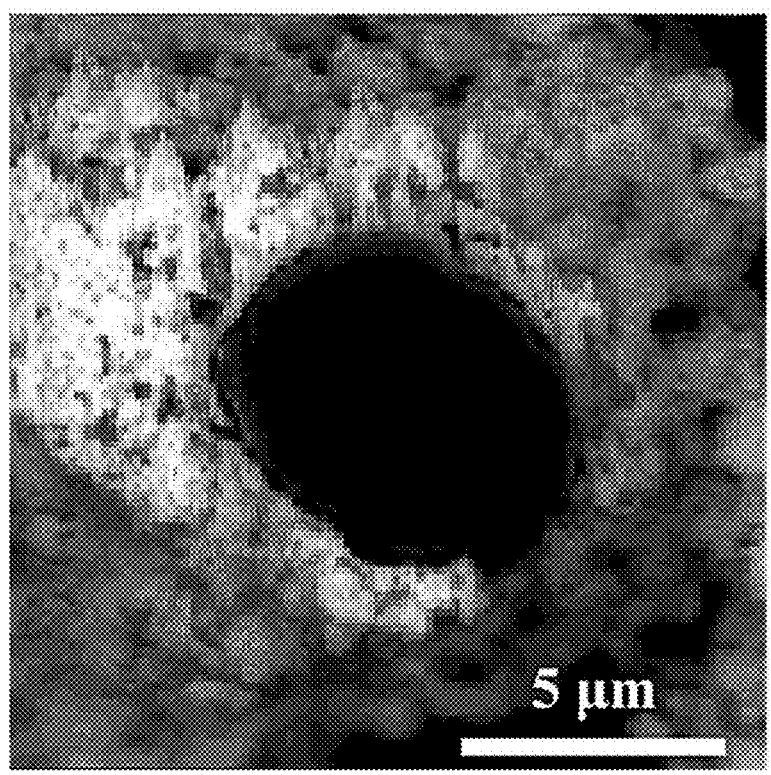
Figure 1D:
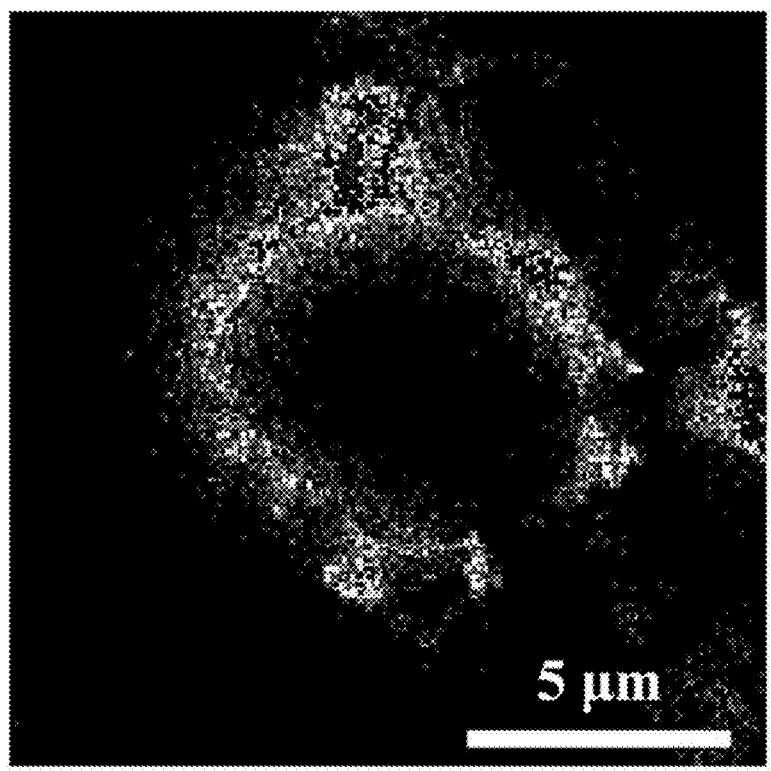
FIG. 1D shows a result of the EPMA mapping.

FIGS. 1A to 1C show SEM images of the Pt/IrO$_2$/CP electrodes of the Examples of the present disclosure, respectively, and FIG. 1D shows a result of the EPMA mapping. FIG. 1A is 200× magnification, FIG. 1B is 20,000× magnification, FIG. 1C is 10,000× magnification, and FIG. 1D is 10,000× magnification.

It could be confirmed that the SEM images of the IP2 electrode had an open structure in which the porous Pt/IrO$_2$/CP electrochemical catalyst had macropores based on a porous carbon material substrate (CP) with randomly crossed carbon fibers (FIG. 1A).

The inter-fiber spaces facilitate the mass transport during the operation of the fuel cell and the water electrolysis device. The distance between the corresponding fibers is, for example, 100 μm or less, and is little blocked by a porous platinum layer.

Meanwhile, a structure in which a porous platinum layer is applied on an IrO$_2$-coated CP shows that the porous platinum coating layer has micropores which are sub-micrometer-sized pores (FIG. 1B). Since the structure becomes a structure in which the platinum layer covers the IrO$_2$ layer, the platinum layer should be a porous layer, such that the reaction of IrO$_2$ is not interrupted.

The cross-section images of individual fibers show that the porous Pt layer-applied IrO$_2$/CP has a several micrometer level thickness. The result of EPMA mapping in the same region shows that a thin IrO$_2$ layer is formed on a carbon fiber.

Figure 2:
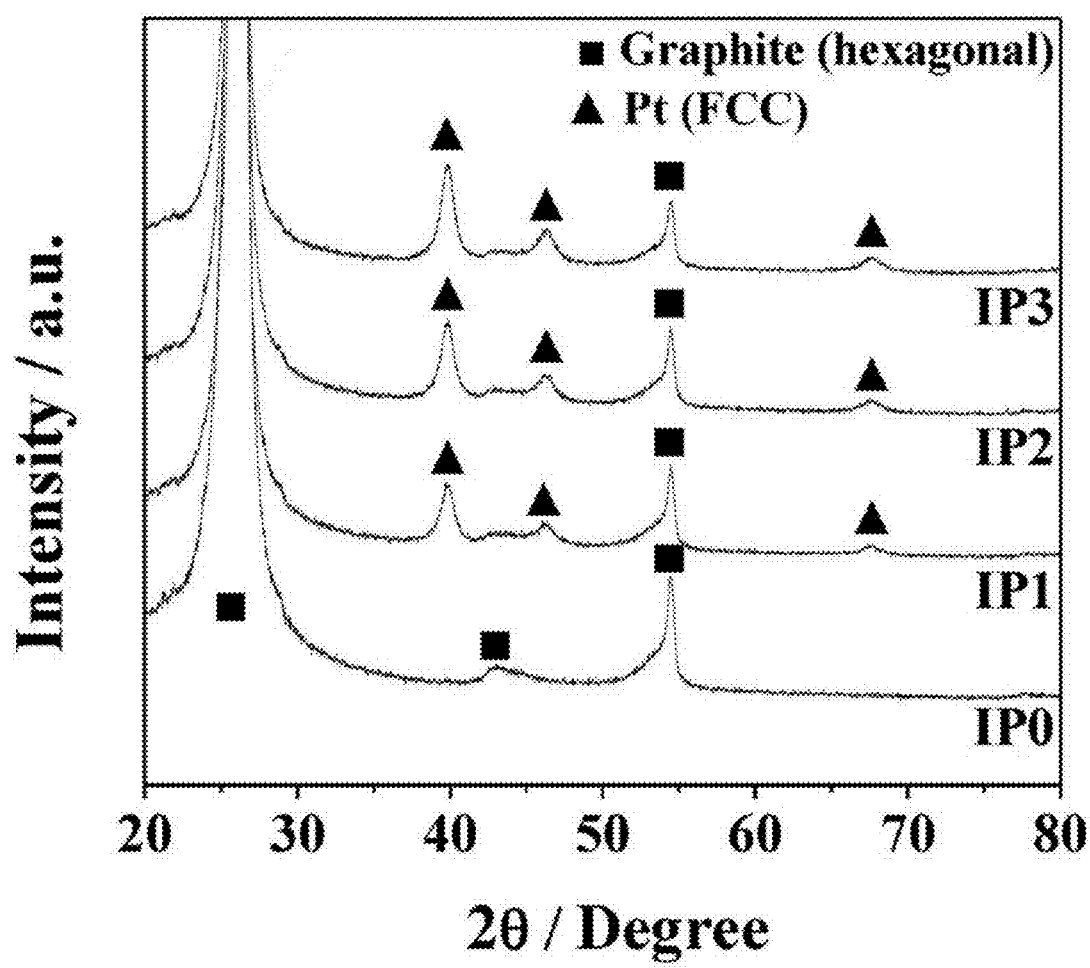
FIG. 2 is a graph showing XRD patterns of the electrodes (IP0, IP1, IP2, and IP3) prepared in the Example.

Meanwhile, FIG. 2 is a graph showing XRD patterns of the electrodes (IP0, IP1, IP2, and IP3) prepared in the Example.

As can be known from FIG. 2, the XRD pattern of IP0 shows diffraction peaks at 26.5°, 42.4°, and 54.7°, showing that the diffraction peaks correspond to (002), (100), and (004) surfaces of graphite, respectively. The absence of the diffraction peak of IrO$_2$ shows that the electrodeposited IrO$_2$ layer is amorphous. The XRD patterns of IP1, IP2, and IP3 show additional peaks at 39.8°, 46.2°, and 67.7°, and the additional peaks correspond to (111), (200), and (220) surface of platinum, respectively.

Figure 3:
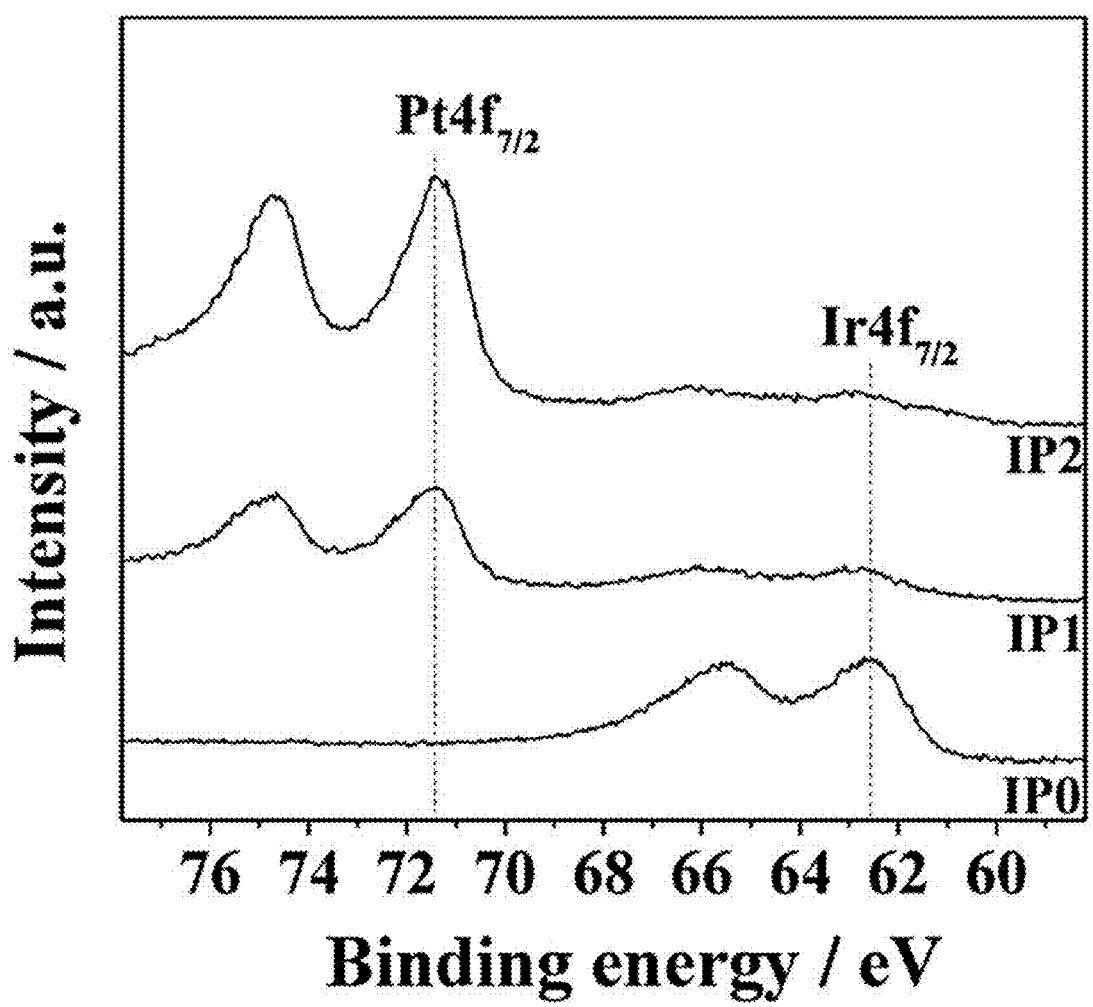
FIG. 3 is a graph showing XPS analysis results of the electrodes (IP0, IP1, and IP2) prepared in the Example.

FIG. 3 is a graph showing XPS analysis results of the electrodes (IP0, IP1, and IP2) prepared in the Example.

The XPS analysis results show that as the loading amount of platinum is increased, the Ir 4f peak strength is significantly decreased, whereas the Pt 4f peak strength is increased. Considering that the photoelectric penetration depth is approximately several nanometer, the increased Pt 4f and decreased Ir 4f peak strengths show that the porous Pt layer is uniformly applied on the surface of IrO$_2$/CP. In addition, the Pt $4f_{7/2}$ binding energy at 71.4 eV shows a metallic platinum surface. The oxidation state of IrO$_2$ is little affected by a platinum layer, and the fact can be confirmed from the fact that the Ir $4f_{2/7}$ binding energy (62.5 eV) is little changed.

Figure 4A:
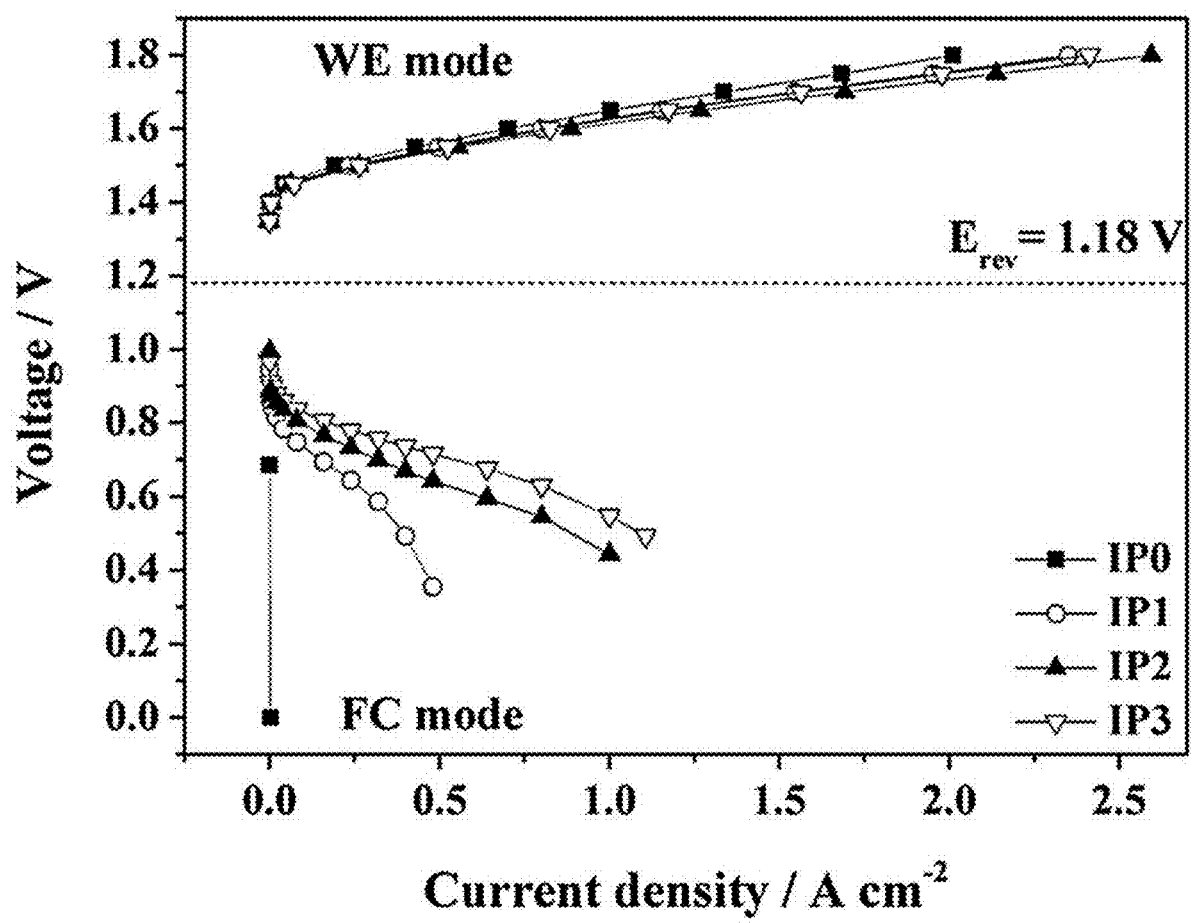
FIG. 4A is a graph showing the polarization curves of URFC single cells in fuel cell and water electrolysis modes in an Example of the present disclosure.

FIG. 4A is a graph showing the polarization curves of fuel cells and an URFC single cell in a water electrolysis mode. The IP0 having an IRO$_2$ of 0.1 mg cm$^{-2}$ exhibits high water electrolysis performance, but the fuel cell performance at the oxygen electrode is very low. As the loading amount of platinum was gradually increased to 0.3 mg cm$^{-2}$ (IP1-> IP3), the fuel cell performance was also enhanced. Specifically, the ORR performance was approximately 100 times higher than a case where iridium oxide was used alone. As the loading amount of platinum is increased, the water electrolysis performance was not greatly changed, and a high water electrolysis activity was maintained. In the Pt/IrO$_2$/CP electrolysis catalysts (IP1, IP2, and IP3), this shows that the porous platinum layer is actively involved in the ORR in the fuel cell mode, and that the IrO$_2$ layer at the lower portion of the platinum layer is well operated as an OER electrochemical catalyst without a significant interruption of the platinum layer in the water electrolysis mode.

Figure 4B:
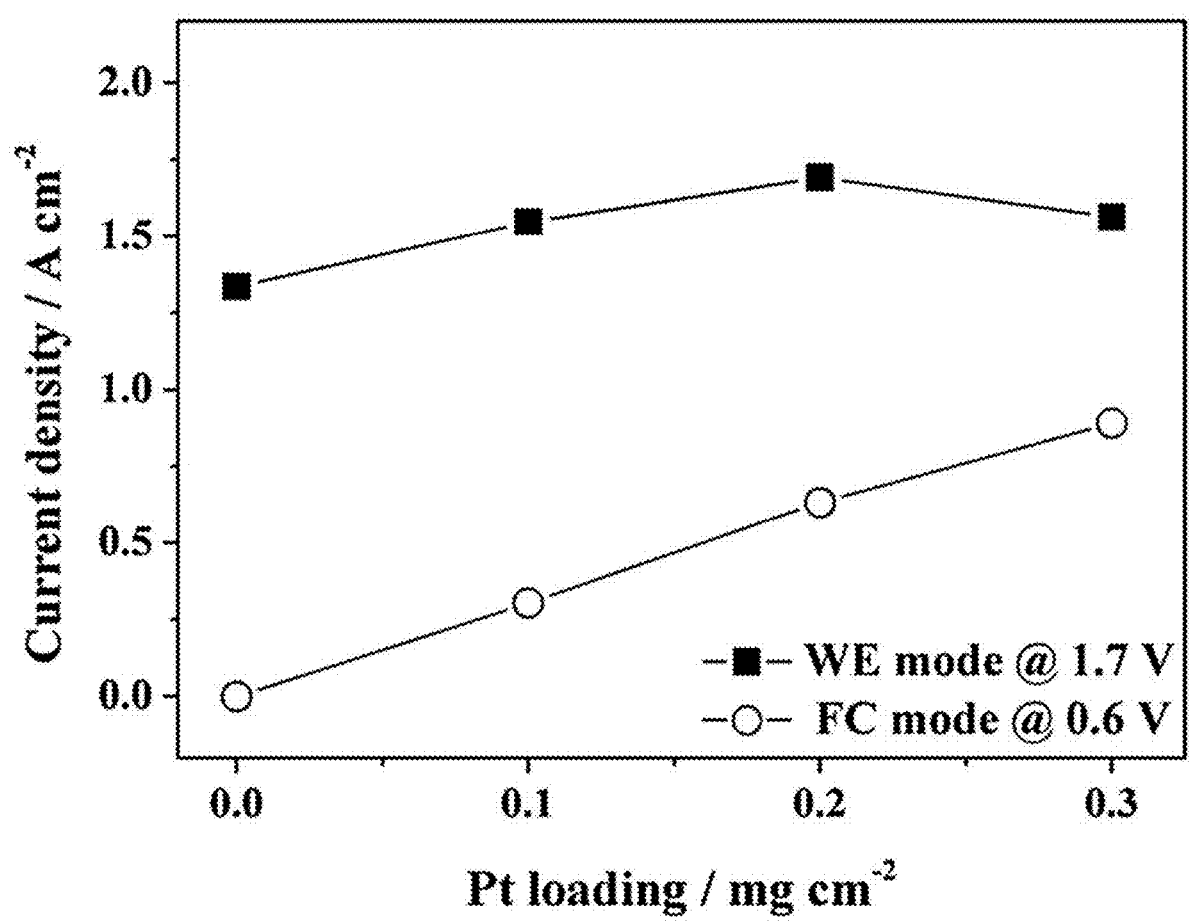
FIG. 4B is a graph showing the reversible cell performance according to the loading amount of platinum at a typical operation voltage (FC: 0.6 V, WE: 1.7 V) in the reversible cell of the Example.

FIG. 4B is a graph showing the reversible cell performance according to the loading amount of platinum at a typical operation voltage (FC: 0.6 V, WE: 1.7 V) in the reversible cell of the Example. In the case of the fuel cell mode, the current density is linearly increased according to the loading amount of platinum, showing that the spray-applied platinum electrochemical catalyst is effectively used until 0.3 mg cm$^{-2}$. In the water electrolysis mode, it was shown that the platinum current density is gradually increased while the loading amount of platinum was increased to 0.2 mg cm$^{-2}$. This shows that the platinum electrochemical catalyst provides an additional OER active site. However, the current density decreased during the water oxidation shows that a relatively thick platinum electrochemical catalyst layer rather interrupts the water transport from the IRO$_2$ layer to the OER active site.

Figure 4C:
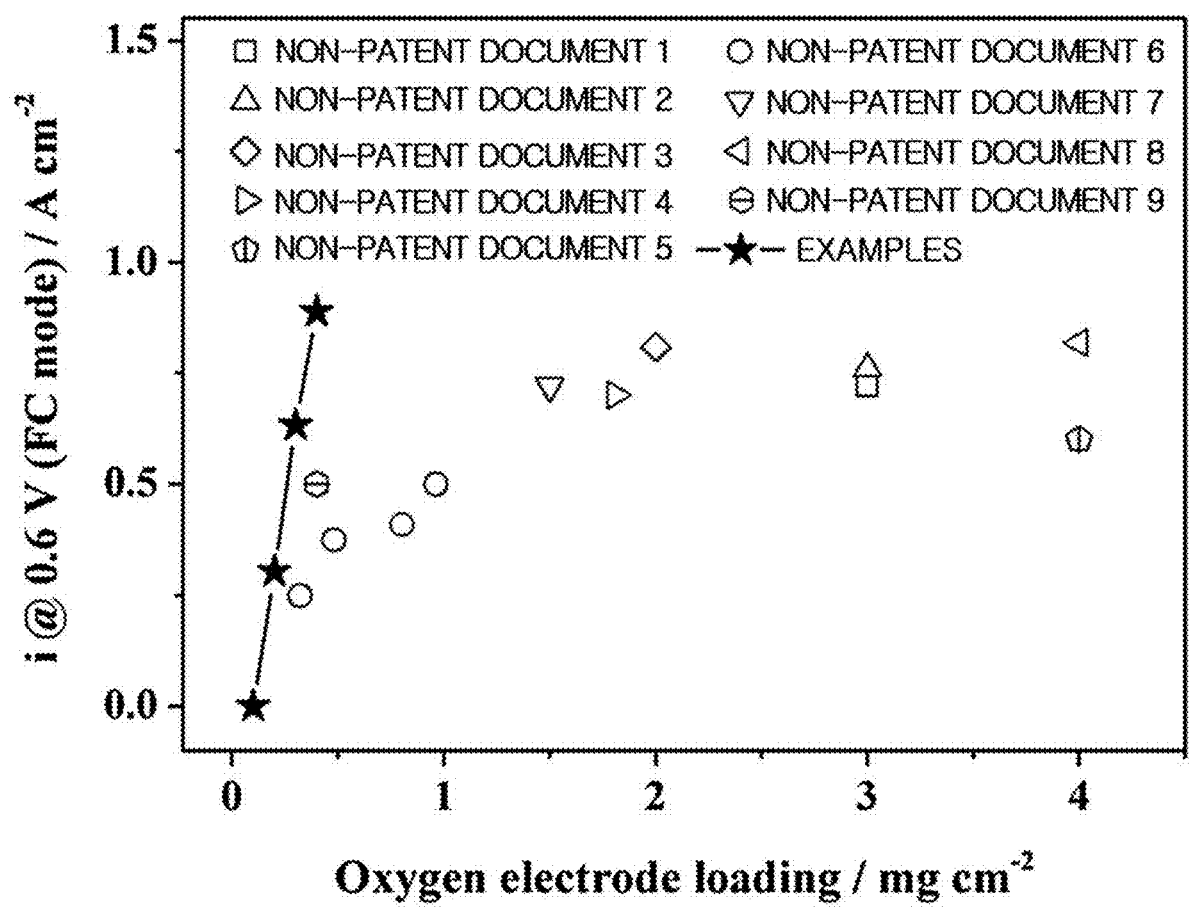
FIG. 4C compares the fuel cell performances according to the loading amount of the electrochemical catalysts of the reversible fuel cells of the Examples of the present disclosure and the reversible fuel cells according to the prior art documents in the related art.

FIG. 4C compares the fuel cell performances according to the loading amount of the electrochemical catalysts of the reversible fuel cells of the Examples of the present disclosure and the reversible fuel cells according to the prior art documents in the related art.

The documents in the related art show that a current density of 0.7 A cm$^{-2}$ or less is obtained even at a high loading amount of the electrochemical catalyst of 1.5 to 4.0 mg cm$^{-2}$.

The following table summarizes the catalysts used, loading amounts, performances, and the like.

TABLE 1

| Catalyst used | | Loading amount mg cm$^{-2}$ | | | Fuel cell performance @ 0.6 V A cm$^{-2}$ | Water electrolysis performance @ 1.7 V A cm$^{-2}$ |
|---|---|---|---|---|---|---|
| | | Total | Pt | Ir or IrO$_2$ | | |
| Non-limiting Patent Paper 1 | Pt + IrO2 | 3 | 2.1 | 0.9 | 0.72 | 1 |
| Non-limiting Patent Paper 2 | Pt + Ir | 0.32 | 0.24 | 0.08 | 0.25 | 0.7 |
| | | 0.48 | 0.36 | 0.12 | 0.375 | 1.28 |
| | | 0.8 | 0.6 | 0.2 | 0.41 | 1.28 |
| | | 0.96 | 0.72 | 0.24 | 0.49 | 1.28 |
| Non-limiting Patent Paper 3 | Pt + IrO2 | 3 | 1.5 | 1.5 | 0.76 | 1.46 |
| Non-limiting Patent Paper 4 | Pt + Ir | 1.5 | 0.75 | 0.75 | 0.72 | 0.98 |
| Non-limiting Patent Paper 5 | RuO$_2$-IrO$_2$/Pt | 2 | 1 | 1(RuO$_2$-IrO$_2$) | 0.81 | 1 |
| Non-limiting Patent Paper 6 | Pt + Ir | 4 | 2.8 | 1.2 | 0.82 | 1.23 |
| Non-limiting Patent Paper 7 | Pt + IrO$_2$ | 1.81 | 0.93 | 0.78 | 0.7 | 0.9 |
| Non-limiting Patent Paper 8 | Pt + IrO$_2$ | 0.4 | 0.2 | 0.2 | 0.5 | 0.35 |
| Non-limiting Patent Paper 9 | Pt + Ir | 4 | 3.4 | 0.6 | 0.6 | 0.08 |

The case where the loading amount is decreased shows that the performance is gradually decreased at less than 0.5 A cm$^{-2}$. On the contrary, in the case of the reversible fuel cells having the porous Pt/IrO$_2$/CP electrode of the Examples, the fuel cell polarization characteristics were better. In particular, IP2 and IP3 showed a current density of 0.63 and 0.89 A cm$^{-2}$, respectively even in the case of a loading of the electrochemical catalyst of less than 1 mg cm$^{-2}$. In this regard, according to those reported in the documents in the related art, the current densities at a similar loading amount were 0.50 A cm$^{-2}$ (0.40 mg cm$^{-2}$) and 0.38 A cm$^{-2}$ (0.48 mg cm$^{-2}$). As described above, the high performance of the porous Pt/IrO$_2$/CP electrode at a low loading amount of the electrochemical catalyst suggests that an effective mass transport according to structural characteristics of the corresponding electrode enables the use of a more effective electrochemical catalyst.

In exemplary embodiments of the present disclosure, since the electrochemical catalyst is mostly attached (deposited) to the surface of the upper layer of the porous carbon material, an open structure having high open characteristics with large inter-fiber spaces (highly open structure with large inter-fiber spaces) may be obtained at a Pt/IrO$_2$/CP electrode. Further, since the supply of oxygen and removal of water during the ORR occur through macropores connected to the interface between the electrochemical catalyst and the membrane, it is thought that reactions easily occur without a limitation of mass transport. This result is in contrast to the fact that in the case of the electrodes in the related art, the transport of oxygen and water occur through small tortuous pores formed among electrochemical particles in the electrode layer Furthermore, the porous platinum structures in the Pt/IrO$_2$/CP electrochemical catalysts of the Examples are a structure which easily transports materials and is very advantageous for the resulting high activity.

Figure 4D:
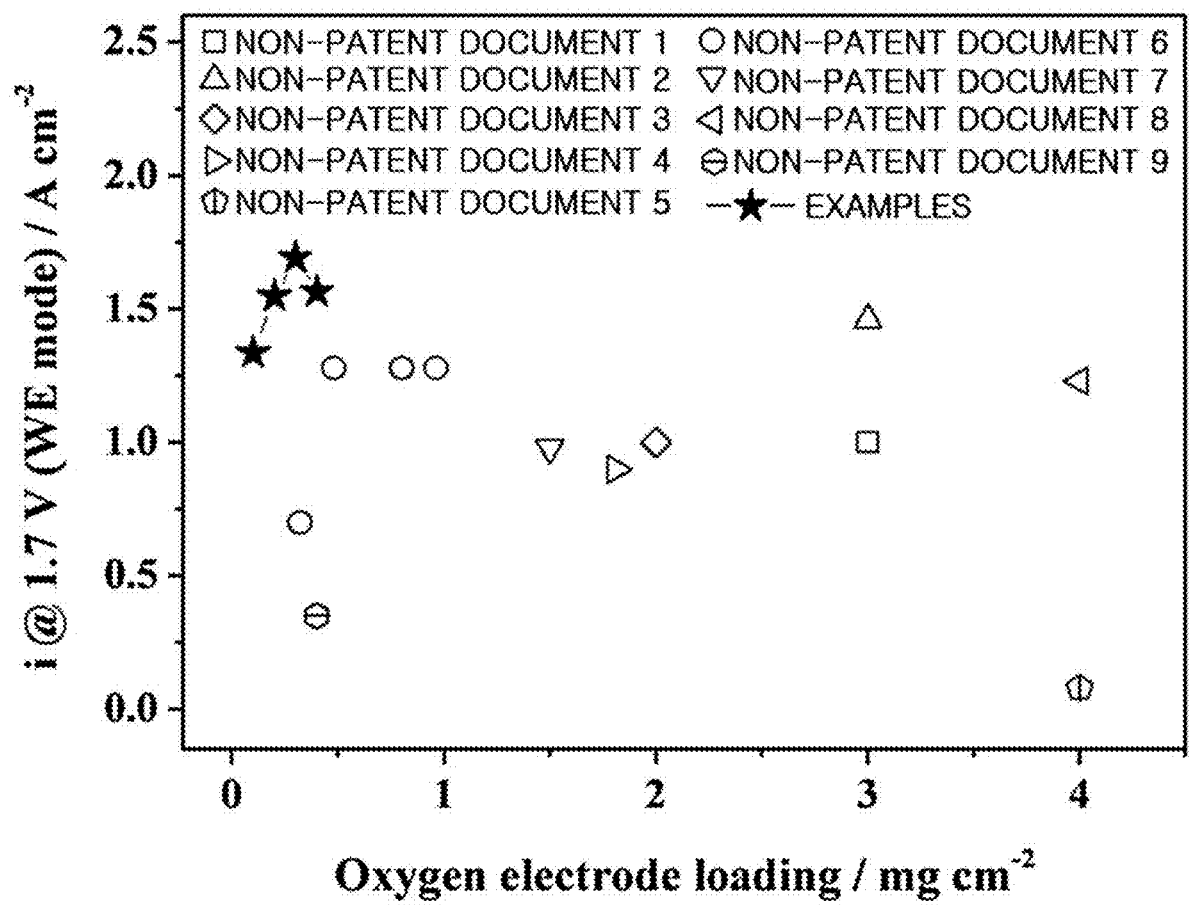
FIG. 4D is a graph showing the water electrolysis performances according to the loading amounts of the catalyst in the electrodes of the Examples.

FIG. 4D is a graph showing the water electrolysis performances according to the loading amounts of the catalyst in the electrodes in the Examples.

From FIG. 4D, it can be known that the water electrolysis (1.5 A cm$^{-2}$ at 1.7 V) of the URFC single cell at the Pt/IrO$_2$/CP electrode is higher than the loading amount of the electrochemical catalyst in the related art. The high water electrolysis performance described above can be explained by an effective mass transport due to the porous platinum layer and a high activity due to the IrO$_2$ coating layer. Since the thickness of the porous platinum layer is small, for example, 0.5 to 3 µm, and micropores due to the porous platinum layer are directly connected to macropores (for example, a pore size of 1 to 100 µm) by inter-fiber spaces, it is shown that oxygen produced from the IrO$_2$ layer may be easily removed through the porous platinum layer, and little interrupts the OER at the lower IrO$_2$ layer. From the fuel cell performance and the water electrolysis performance, a round trip efficiency (hereinafter referred to as $\varepsilon_{RT}$) which is a charge/discharge efficiency may be defined as a ratio of a cell voltage in the fuel cell mode to a cell voltage in the water electrolysis mode at a given current density, and the round trip efficiency may be a measure of the energy conversion efficiency of a reversible fuel cell. The fact that as the loading amount of platinum is increased (IP0: 0→IP3: 0.46), $\varepsilon_{RT}$ is significantly enhanced is because the higher the loading amount of platinum is, the higher the fuel cell efficiency is. The $\varepsilon_{RT}$ of IP2 and IP3 is 0.42 and 0.46 (0.5 A cm$^{-2}$), respectively, which are a level comparable to the large loading amount (1.5 to 4 mg cm$^{-2}$) of an oxygen electrode in the related art. For reference, documents in the related art report that the $\varepsilon_{RT}$ is reduced to less than 0.38, which is a very low value when the loading amount of the electrochemical catalyst is less than 1 mg cm$^{-2}$.

As described above, it could be confirmed that a high performance was obtained by using the porous Pt/IrO$_2$/CP electrode in the reversible fuel cell even at a reduced loading amount (0.1 to 0.4 mg cm$^{-2}$) of the oxygen electrode electrochemical catalyst. In particular, the IP3 (loading amount 0.4 mg cm$^{-2}$) exhibited a very high performance in terms of both fuel cell performance and water electrolysis performance. Further, as the loading amount of platinum was increased to 0.3 mg cm$^{-2}$, the water electrolysis performance was little affected while the fuel cell performance was increased, and accordingly, a high $\varepsilon_{RT}$ (0.46 in the case of the IP3) was exhibited. The high performance as described above is because the mass transport effectively occurs according to the open structure of the Pt/IrO$_2$/CP electrode.

Figure 5A:
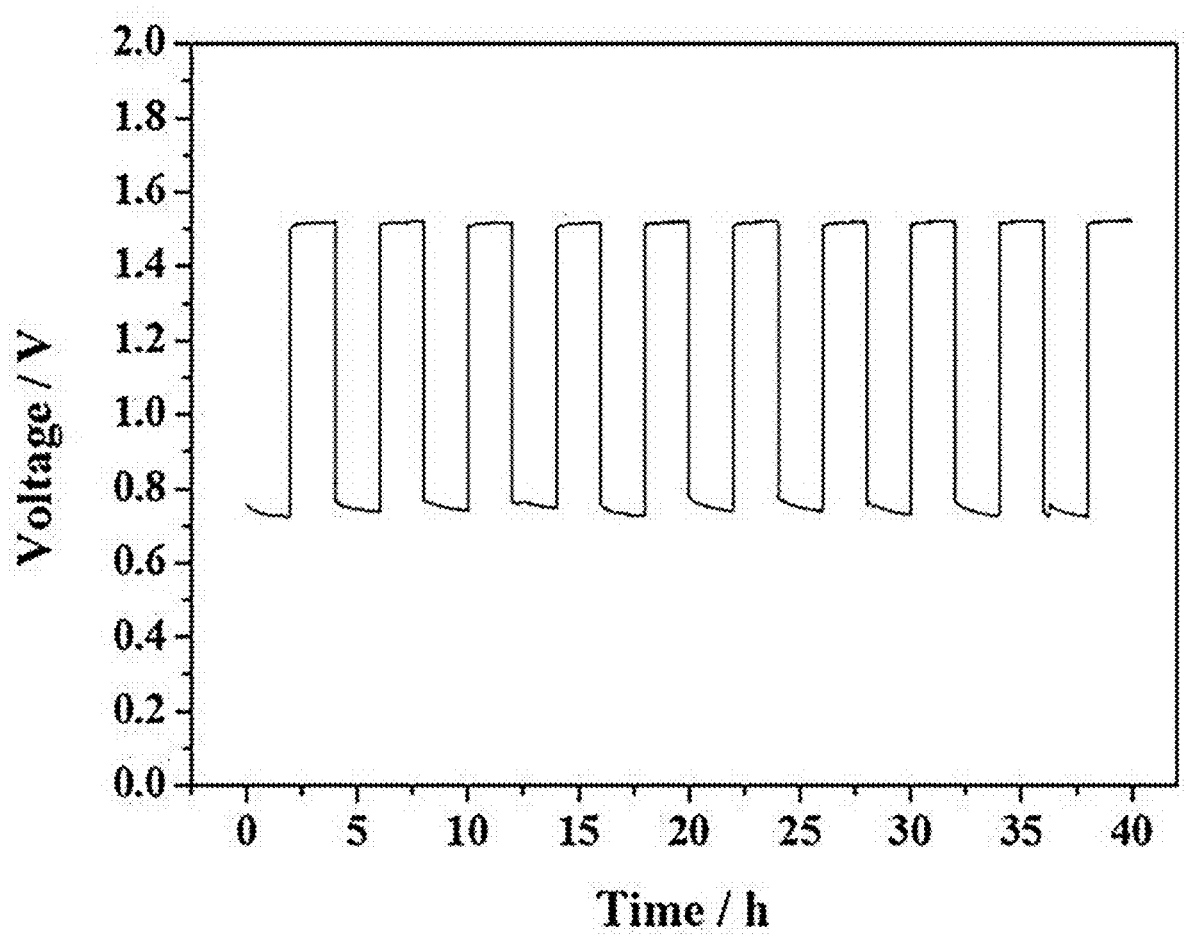
FIG. 5A is a graph showing the reversible cell performance according to the time when the fuel cell mode and the water electrolysis mode are alternately driven (switching mode) in an Example of the present disclosure.

FIG. 5A is a graph showing a change in performance according to the time when the reversible fuel cell is alternately driven (switching mode) in the fuel cell mode and the water electrolysis mode at a current density of 0.3 A/cm$^2$.

From FIG. 5A, it can be known that while the fuel cell mode and the water electrolysis mode are driven each 10 times for 2 hours, that is, for total 40 hours, the performance of the reversible fuel cell is constantly maintained. It can be seen that the durability of a reversible fuel cell using an electrode developed therefrom is excellent. As previously described, it can be seen that the surface of the porous carbon material, which is a preferred structure capable of preventing a carbon material from being corroded, is covered with an $IrO_2$ layer, and the $IrO_2$ layer is formed through a crack-free structure.

Figure 5B:
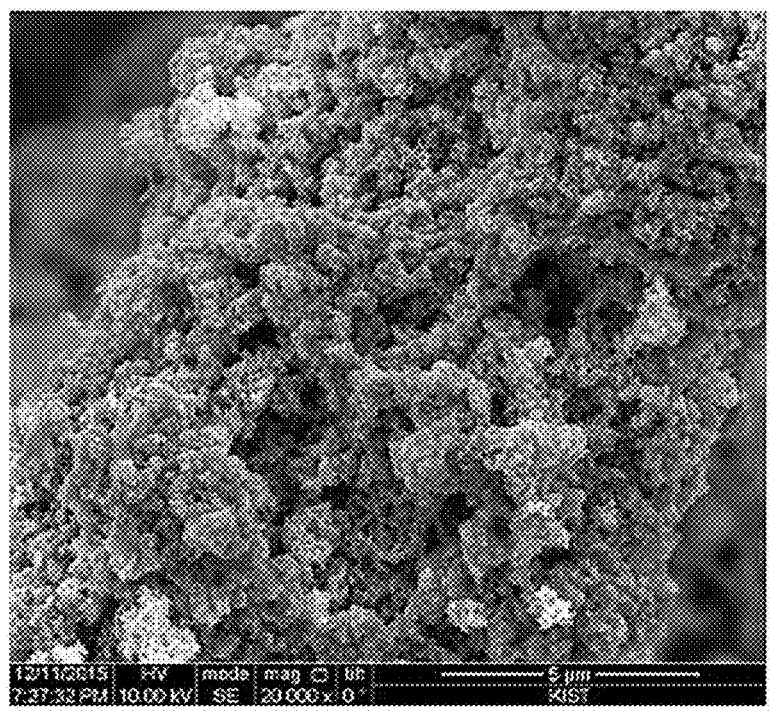
FIG. 5B is a scanning electron microscope (SEM) photograph of the electrode before the fuel cell mode and the water electrolysis mode are alternately driven (i.e., switching mode is driven) for 40 hours in an Example of the present disclosure.
Figure 5C:
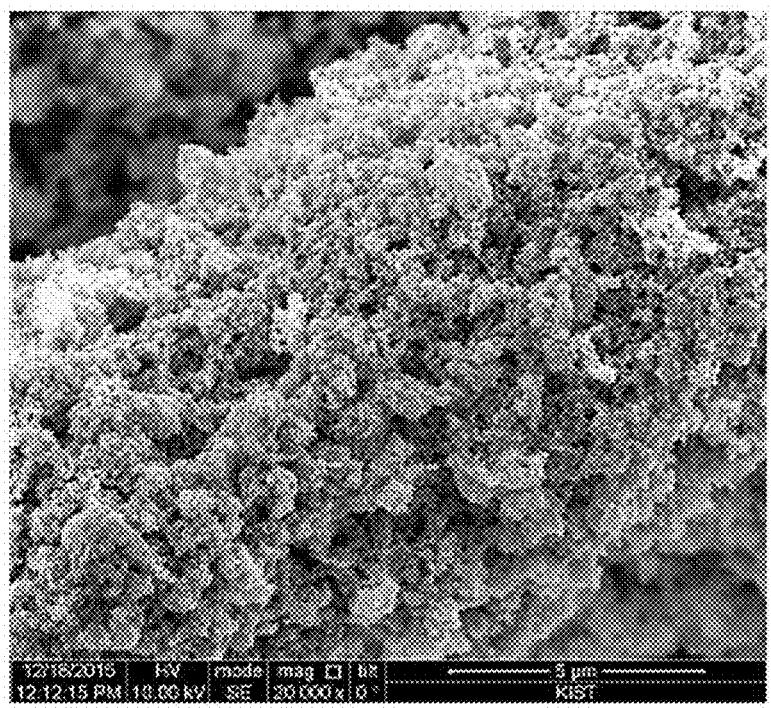
FIG. 5C is a scanning electron microscope (SEM) photograph of the electrode after the fuel cell mode and the water electrolysis are alternately driven (i.e., switching mode is driven) for 40 hours in an Example of the present disclosure.

FIGS. 5B and 5C are SEM photographs of the electrode before (FIG. 5B) and after (FIG. 5C) the reversible fuel cell is alternately driven in the fuel cell mode and the water electrolysis mode at a current density of 0.3 A/cm$^2$, respectively.

From FIGS. 5B and 5C, it can be known that even after the driving for 40 hours, the structure of the prepared electrode is maintained equally to the initial structure. From the observation, it can be seen that the high durability of the reversible fuel cell shown in FIG. 5A results from a stable electrode structure.

Figure 6A:
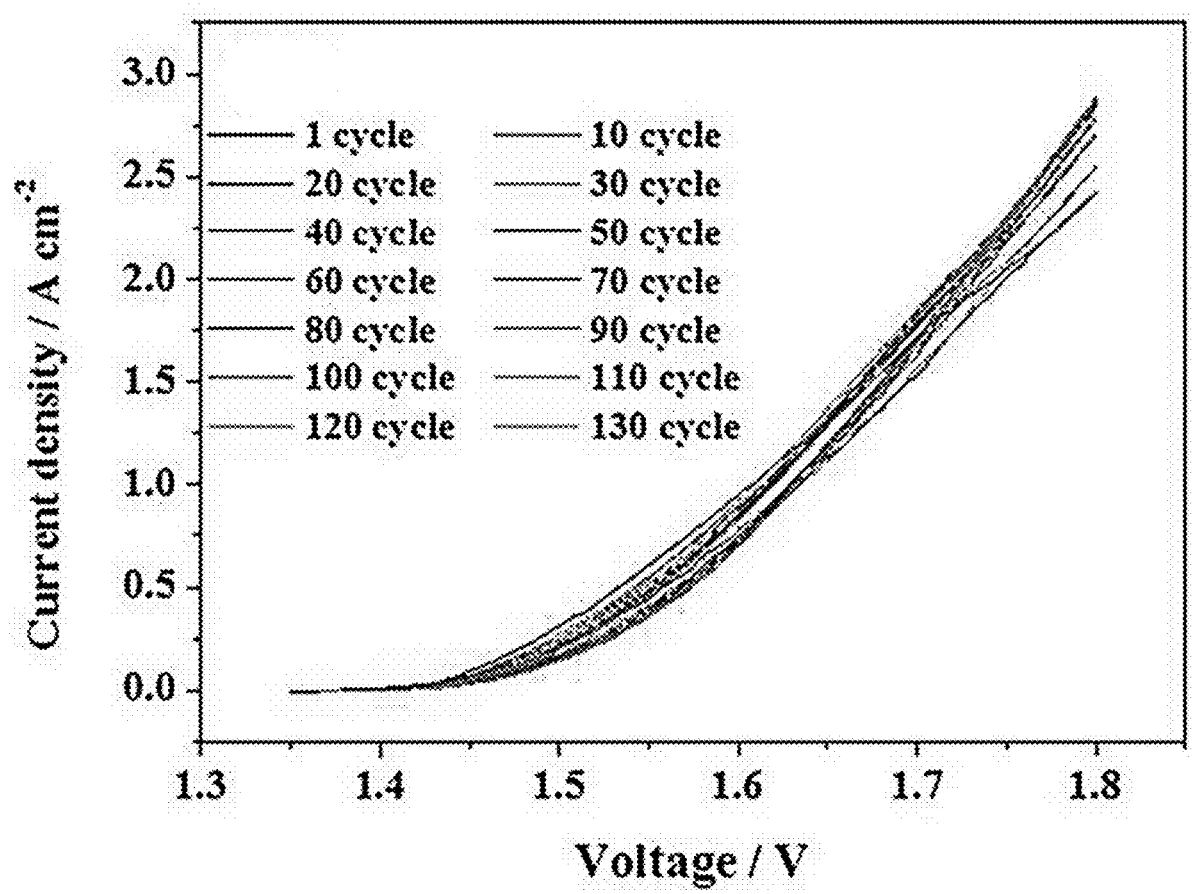
FIG. 6A is a result that the oxygen electrode is tested 130 times in a voltage range from 1.35 V to 1.80 V by using a cyclic voltammetry in an Example of the present disclosure.

FIG. 6A is a result obtained by performing a cyclic voltammetry experiment 130 times in a voltage range from 1.35 V to 1.80 V at an oxygen electrode of the reversible fuel cell.

From FIG. 6A, it can be seen that while the cyclic voltammetry experiment is performed 130 times, a significant difference in cyclic voltammogram is not observed. Under the driving conditions of the water electrolysis mode of the reversible fuel cell, there may be concern in that the reversible fuel cell is degraded by corrosion of the electrode material due to a high electrode voltage, but from the fact that a significant difference is not observed in the cyclic voltammetry experiment performed 130 times, it can be seen that a developed electrode is not degraded by corrosion of the electrode material, and it can be expected that an electrode developed therefrom will have high durability even during the driving of the reversible fuel cell for a long period of time.

Figure 6B:
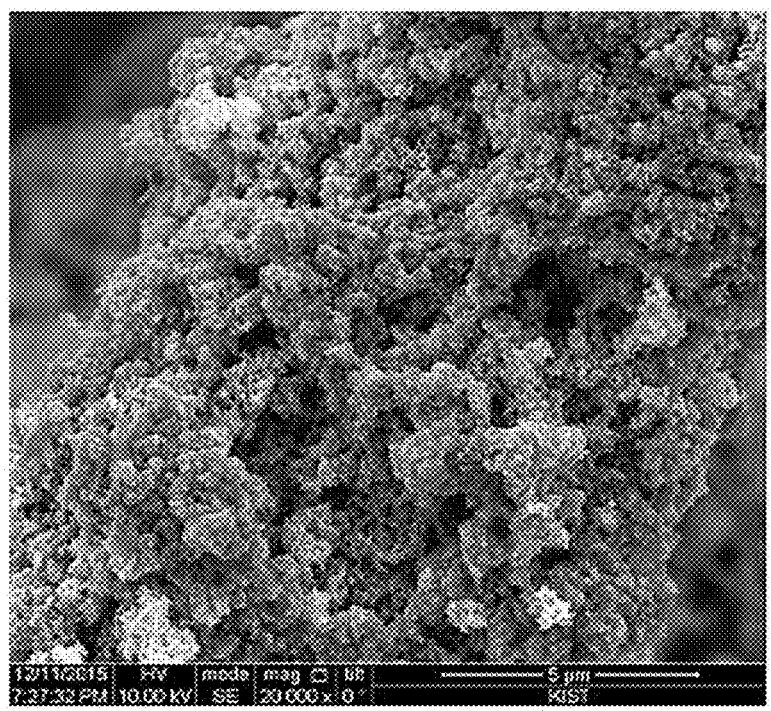
FIG. 6B is an SEM photograph of the electrode before the test is performed 130 times in a voltage range from 1.35 V to 1.80 V by using a cyclic voltammetry in an Example of the present disclosure.
Figure 6C:
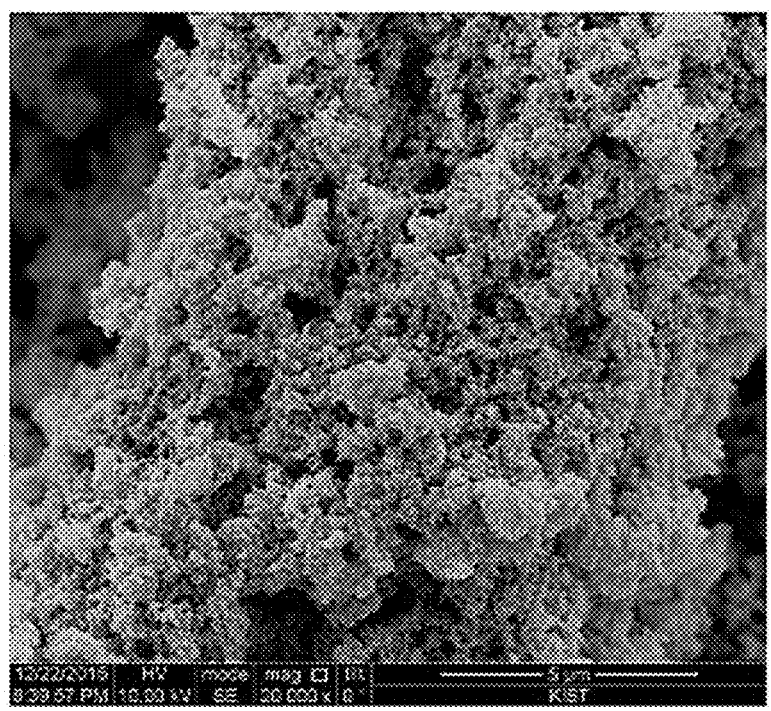
FIG. 6C is an SEM photograph of the electrode after the test is performed 130 times in a voltage range from 1.35 V to 1.80 V by using a cyclic voltammetry in an Example of the present disclosure.

FIGS. 6B and 6C are SEM photographs of the electrode before (FIG. 6B) and after (FIG. 6C) the cyclic voltammetry experiment is performed 130 times in a voltage range from 1.35 V to 1.80 V at an oxygen electrode of the reversible fuel cell, respectively From FIGS. 6B and 6C, it can be seen that even after the cyclic voltammetry experiment is performed 130 times, the initial structure of the electrode is maintained without any significant difference. From the fact, it can be known that the developed electrode is not corroded even though being repeatedly exposed to high voltage, and from the fact, it can be seen that excellent durability as shown in FIG. 6A is exhibited.

Non-limiting and exemplary Examples of the present disclosure have been explained as described above, but the technical spirit of the present disclosure is not limited by the accompanying drawings or the aforementioned explanation. It is obvious to a person with ordinary skill in the art that various modifications are possible within the scope not departing from the technical spirit of the present disclosure, and it can be said that the modification also fall within the claims of the present disclosure.

What is claimed is:

1. A reversible fuel cell oxygen electrode comprising:
   a porous carbon material;
   $IrO_2$ formed on a surface of the porous carbon material; and
   platinum formed on the $IrO_2$,
   wherein the $IrO_2$ formed on the surface of the porous carbon comprises an $IrO_2$ layer or an $IrO_2$ layer having $IrO_2$ particles attached,
   the platinum comprises a porous platinum layer formed on the $IrO_2$ layer of the $IrO_2$ layer having the $IrO_2$ particles attached, and
   the electrode has macropores due to the porous carbon material and micropores due to the porous platinum layer.

2. The reversible fuel cell oxygen electrode according to claim 1, wherein the porous carbon material is a hydrophilic porous carbon material.

3. The reversible fuel cell oxygen electrode according to claim 1, wherein the porous carbon material has macropores due to inter-carbon fiber spaces,
   carbon fiber strands on the surface of the porous carbon material are covered with the $IrO_2$ layer or the $IrO_2$ layer having the $IrO_2$ particles attached, and
   the porous platinum layer is formed on the $IrO_2$ layer or the $IrO_2$ layer having the $IrO_2$ particles attached.

4. The reversible fuel cell oxygen electrode according to claim 3, wherein the porous carbon material is a carbon paper.

5. The reversible fuel cell oxygen electrode according to claim 1, wherein the $IrO_2$ layer has a carbon exposure-free structure in which the porous carbon material is not exposed.

6. The reversible fuel cell oxygen electrode according to claim 1, wherein the $IrO_2$ layer has a crack-free structure.

7. The reversible fuel cell oxygen electrode according to claim 1, wherein the electrode has a structure in which the micropores are connected to the macropores, and the macropores are connected to an interface of a membrane.

8. The reversible fuel cell oxygen electrode according to claim 1, wherein the $IrO_2$ layer has a thickness of 0.01 to 1 μm, and the $IrO_2$ particles, if present, have a size of 0.1 to 3 μm.

9. The reversible fuel cell oxygen electrode according to claim 1, wherein the $IrO_2$ is disposed on the surface of the porous carbon material in a range of 0.01 to 1.00 mg cm$^{-2}$.

10. The reversible fuel cell oxygen electrode according to claim 1, wherein the porous platinum layer has a thickness of 0.5 to 3 μm.

11. The reversible fuel cell oxygen electrode according to claim 1, wherein the platinum is disposed on the $IrO_2$ in a range of 0.01 to 1 mg cm$^{-2}$.

12. A reversible fuel cell comprising the oxygen electrode according to claim 1.

13. A method for preparing the reversible fuel cell oxygen electrode according to claim 1, the method comprising:
   electrodepositing the $IrO_2$ on the surface of the porous carbon material; and
   applying the platinum onto the $IrO_2$-electrodeposited porous carbon material to form the porous platinum layer.

14. The method according to 13, wherein when electrodeposition is performed on the porous carbon material, one or more of a deposition voltage and a deposition time are such that the deposition voltage is 0.6 to 0.8 V, and the deposition time is 3 to 30 minutes.

15. The method according to 13, wherein the applying comprises spraying the platinum onto the $IrO_2$ electrodeposited porous carbon material.

16. A reversible fuel cell oxygen electrode comprising:
   a macro-porous structure comprising a carbon material that forms pores in the macro-porous structure in a range of 1 to 100 micrometers;

$IrO_2$ covering the carbon material such that the pores in the macro-porous structure are substantially in a range of 1 to 100 micrometers; and a micro-porous structure comprising platinum that covers a surface of the $IrO_2$ opposite the carbon material.

17. The reversible fuel cell oxygen electrode of claim 16, wherein the $IrO_2$ covers the carbon material such that the entire surface of the macro-porous structure is covered by the $IrO_2$.

18. The reversible fuel cell oxygen electrode of claim 16, wherein the $IrO_2$ comprises $IrO_2$ particles on a $IrO_2$ layer.

19. The reversible fuel cell oxygen electrode of claim 18, wherein the micro-porous structure covers the $IrO_2$ particles and the $IrO_2$ layer.

* * * * *